US006948776B1

(12) United States Patent
Harmon et al.

(10) Patent No.: US 6,948,776 B1
(45) Date of Patent: Sep. 27, 2005

(54) ADJUSTABLE ARMREST

(76) Inventors: Michael L. Harmon, 51501 Stratton Ct., Granger, IN (US) 46530; David C. Thoman, 51614 Highland Shores Driveon Ct., Granger, IN (US) 46530

( * ) Notice: Subject to any disclaimer, the term of this patent is extended or adjusted under 35 U.S.C. 154(b) by 0 days.

(21) Appl. No.: 10/707,923

(22) Filed: Jan. 26, 2004

(51) Int. Cl.$^7$ ............................................. B60N 2/46
(52) U.S. Cl. ............................................. 297/411.39
(58) Field of Search ................ 297/411.39, 411.38, 297/411.35, 411.2, 411.32, 411.3, 354.13

(56) References Cited

U.S. PATENT DOCUMENTS

| | | | | |
|---|---|---|---|---|
| 4,270,798 A | * | 6/1981 | Harder, Jr. ............. | 297/411.31 |
| 5,702,157 A | | 12/1997 | Hurite | |
| 5,984,416 A | * | 11/1999 | Waldo et al. .......... | 297/411.38 |
| 6,209,960 B1 | * | 4/2001 | Bradbury ............... | 297/411.35 |
| 6,467,847 B2 | * | 10/2002 | Bidare ................... | 297/411.32 |
| 6,652,032 B2 | | 11/2003 | Laval et al. | |
| 6,663,182 B1 | | 12/2003 | Dolci et al. | |
| 6,752,462 B1 | * | 6/2004 | Kain et al. ............. | 297/411.38 |

* cited by examiner

Primary Examiner—Milton Nelson, Jr.
(74) Attorney, Agent, or Firm—Leo H McCormick, Jr.

(57) ABSTRACT

An armrest retained a first pin that extends from a back member that is rotatable with respect to a base for a seat. A first lever located within the armrest defines a cantilevered beam with teeth thereon that mesh with teeth on a plate secured to the first pin. A second lever located on a second pin within the armrest positions a ball held in an opening therein in tangential engagement with the armrest and in contact engagement with the first lever. The second lever responds to an input force by pivoting on the second pin and apply a force through the ball to laterally move the teeth out of meshing engagement and permit the armrest to pivot on the first pin into a desired alignment with the base. On termination of the input force, the cantilever beam returns the teeth to meshing engagement to sustain the desired alignment.

14 Claims, 5 Drawing Sheets

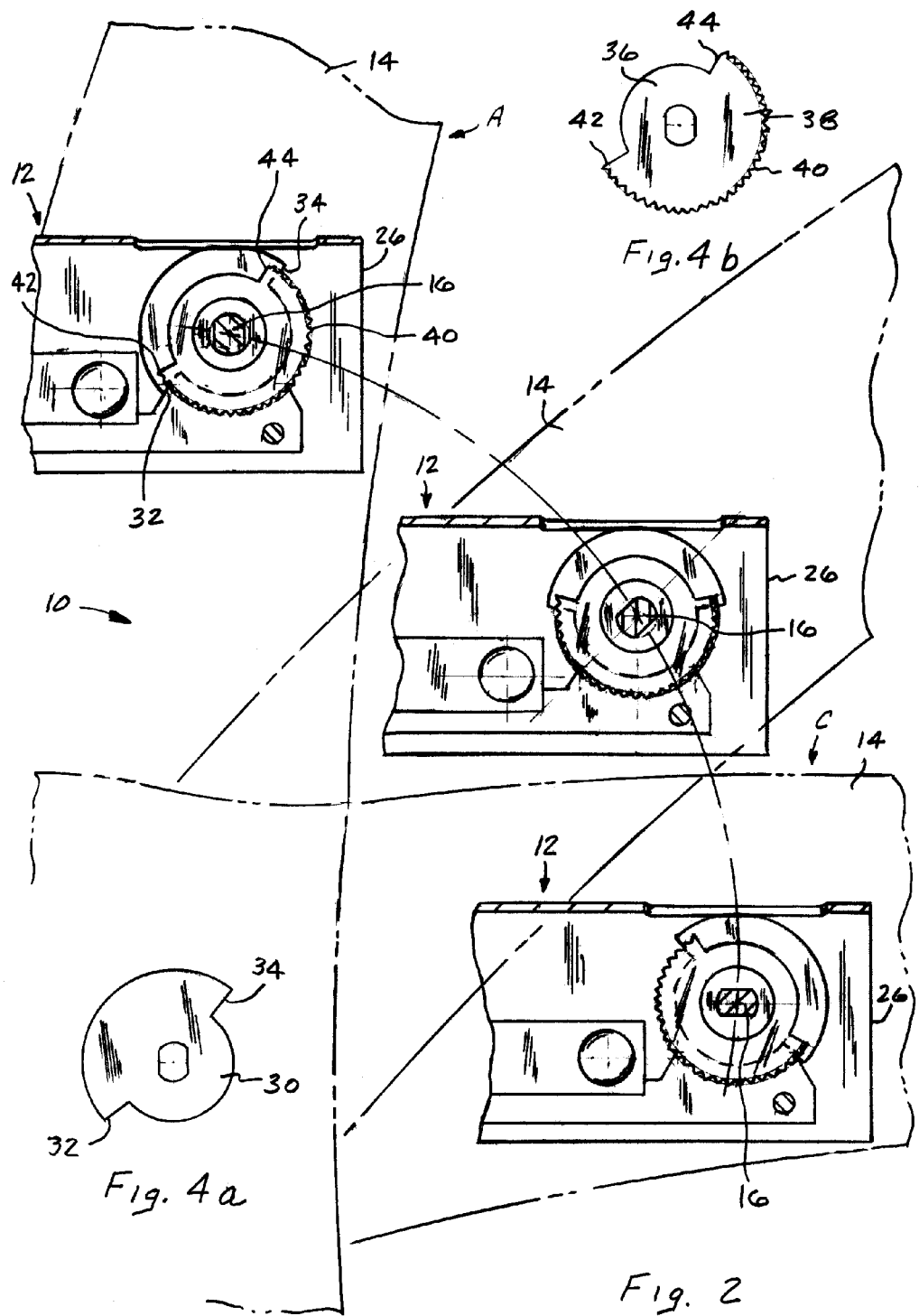

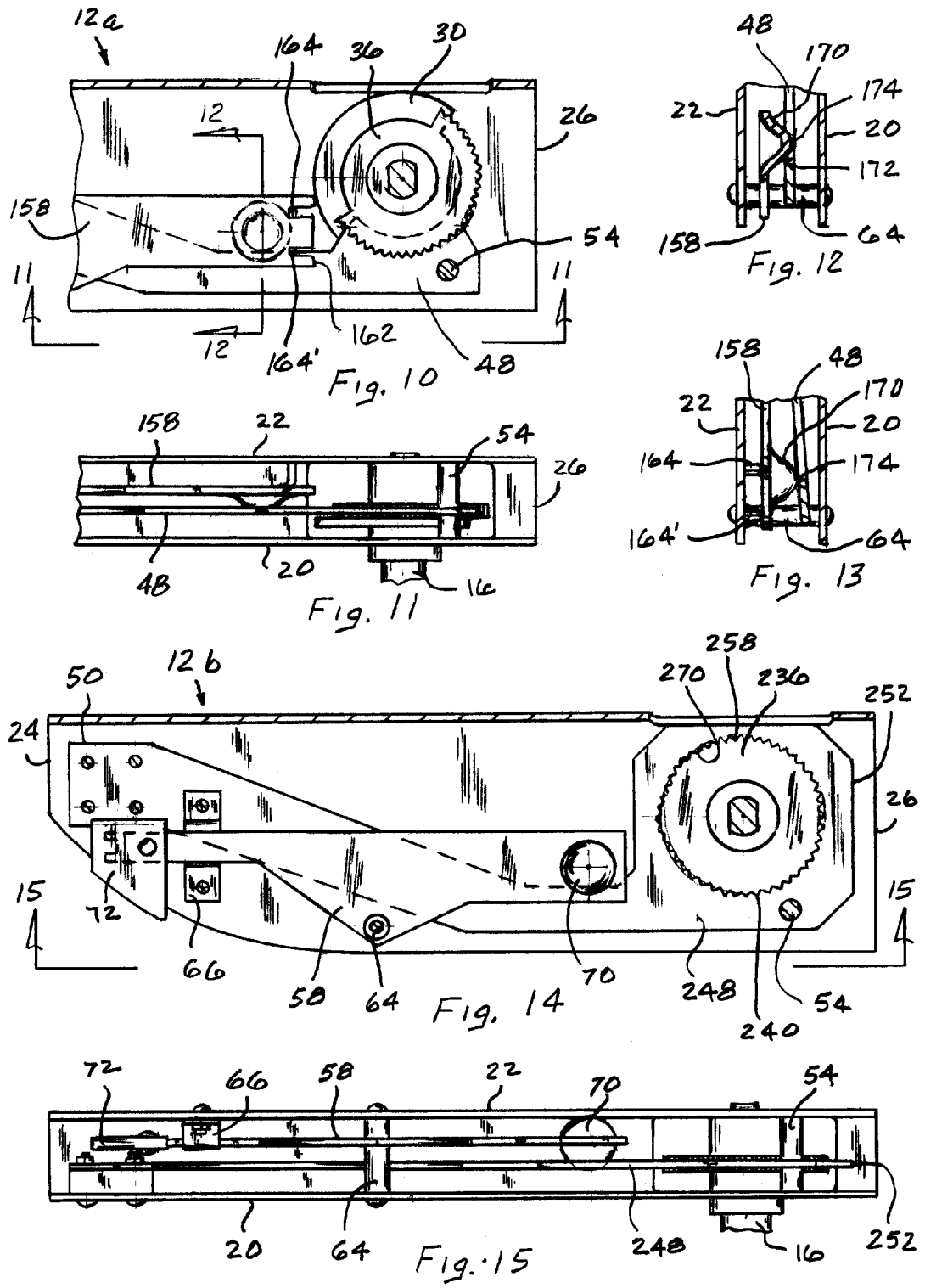

ADJUSTABLE ARMREST

BACKGROUND OF INVENTION

This invention relates to an armrest that is adjustable in a radial plane of a pivot pin associated with a back member of a seat to align the armrest in a parallel relationship with a bottom member of the seat.

Currently available automobiles often have a seat with various controls whereby the position of the seat may be adjusted to accommodate individual seating preferences. The controls may include an adjustment for an armrest and a back member. Initial armrests were designed to be moved from an in-use position that is parallel with the base or bottom of a seat to a non-use position that is parallel with the back member. Later the armrests were attached to the back member and the adjustment for the back member expanded from a substantially vertical position to a substantially horizontal position with respect to the base or bottom of the seat. Unfortunately, the alignment of the armrest mirrors the alignment changes of the back member and as a consequence when the back member is in a horizontal position, the armrest may be located at an inclined angle with respect to the base or bottom of the seat. U.S. Pat. Nos. 5,702,157, 5,984,416 and 6,663,180 disclosure various components for adjusting the armrest to provide for selective alignment with respect to the base or bottom of the seat. While the disclosed components provide for selective adjustment, the strength of the adjusting structure is limited through a single engaging pawl with a gear.

It is an object of this invention to provide an armrest retained on a back member with a mechanism to lock and retain the armrest in a desired position with respect to a base or seat bottom as the back member is rotated between a substantially vertical and a horizontal position with respect to the base or seat bottom.

The armrest has a housing that is defined by a U-shaped member with parallel first and second side walls, each of which has a first end and a second end with a first opening adjacent the second end. The housing is located on the back member by a first pivot pin that extends from the back member that and passes through the first opening in each of the first and second side walls such that the first end of the housing may pivot with respect to the first pivot pin. A first plate is fixed to the first pivot pin and is located in a first plane between the first and second side walls. The first plate has a peripheral surface with an arcuate segment removed there from to define a first stop and a second stop that correspond to a desired limit of rotation of the housing with respect to the base or seat bottom. A second plate is also fixed to the first pivot pin and located in a second plane between the first plate and the second side wall. The second plate has an arcuate surface thereon with a first plurality of teeth thereon that extend from a first location aligned with the first stop on the first plate to a second location aligned with the second stop on the first plate. A first lever has a first end that is attached to the first side wall to define a cantilevered beam and position a second plurality of teeth adjacent to a second end thereof with the first plurality of teeth on the second plate. A second lever that has a first end and a second end is located in the housing by a second pivot pin located between a first end and a second end. The second lever has an oval slot located adjacent the second end for receiving a ball such that the second pivot pin locates the ball adjacent the second plate with the ball held in tangential engagement with the second side wall and in contact engagement with the first lever. An actuator member that is attached to the first end of the second lever receives an input force that causes the second end of the second lever to pivot about the second pivot pin and move the ball along and on the second side wall such that a force is applied to the first lever through the contact engagement such that the first lever is laterally moved toward the first side wall as a function of the resiliency of the cantilevered beam. Lateral movement of the second end of the first lever moves the second plurality of teeth out of meshing engagement with the first plurality of teeth and into an alignment between the first stop and the second stop on the first plate. When the second plurality of teeth are aligned on the first plate, the first end of the housing may be moved by pivoting about the first pivot pin to a desired alignment with respect to the base or seat bottom. When the end of the housing is at a desired alignment with respect to the base or seat bottom, the input force is removed from the actuation member and the internal resiliency of the cantilevered beam returns the second end of the first lever into perpendicular alignment with the first pivot pin such that the second plurality of teeth again mesh with the first plurality of teeth to retain the first end of the housing in the desired alignment with the base or seat bottom.

An advantage of this invention resides in a robust locking mechanism for an armrest that is attached to a back member wherein a plurality of arcuate teeth are in meshing engagement with corresponding arcuate teeth on a plate fixed to a pivot pin on the back member.

It is further object of this invention is to provide an armrest that is attached to a back member the may be rotated and retained in a parallel alignment with a base or seat bottom when the back member is rotated between a vertical position and a horizontal position.

BRIEF DESCRIPTION OF DRAWINGS

FIG. 2 is an enlarged view of a portion of the armrest showing a rotational alignment that is necessary to maintain a parallel relationship with the bottom member of the seat as the back member is rotated from a substantial horizontal to a substantial vertical position;

FIG. 4a is a view of a stop plate for the retention arrangement of the armrest of FIG. 1;

FIG. 4b is a view of a ratchet plate of the retention arrangement of the armrest of FIG. 1;

FIG. 10 is a schematic illustration of the armrest of FIG. 4 with a secondary embodiment for the actuator;

FIG. 11 is a view taken along lines 11—11 of FIG. 10 with the armrest in a locked position with respect to the back member;

FIG. 12 is a sectional view taken along lines 12—12 of FIG. 10;

FIG. 13 is a sectional view showing a relationship between the components of FIG. 12 to permit movement of the armrest with respect to the back member;

FIG. 14 is a sectional view of a secondary embodiment of a cantilever lever for the armrest of FIG. 4;

FIG. 15 is a view taken along lines 15—15 of FIG. 14;

DETAILED DESCRIPTION

In the illustrations of the various embodiment a same number is used to identify a same component without further detail unless some functional difference is achieved.

Figure 1:
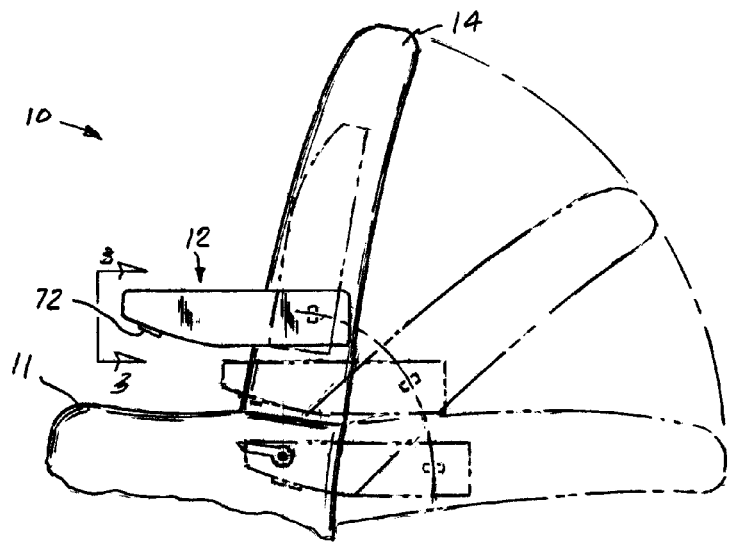
FIG. 1 is a schematic illustration of a seat and a back member with an armrest made according to the present invention attached to the back member.
Figure 3:
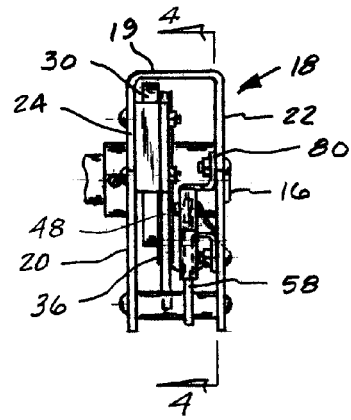
FIG. 3 is an end view of the armrest taken along lines 3—3 of FIG. 1.

FIG. 1 is a schematic illustration of a seat 10 having an armrest 12 that may be selectively adjusted from an in-use position that is approximately parallel with the a bottom or base 11 of seat 10 to a stowed or rest position that is approximately parallel to the back member 14 of seat 10. The back member 14 as illustrated in FIGS. 1 and 2, may be may be rotated from a position "A" that is approximately perpendicular with the base 11 of seat 10 to an extreme position "C" that is approximately parallel with the base 11 of seat 10. The armrest 12 is secured to the frame work of the back member 14 by a pin 16 that extends therefrom and as shown by the dashed lines, the pin 16 travels in an arc with respect to the base 11 of seat 10 as the back member 14 is moved between a vertical position "A" toward a horizontal position "C". In order to provide support for the arm of an individual, it is desirable to be able to adjust the armrest 12 to a conformable position and most often this comfortable position is in a plane that is parallel with the base 11 of seat 10. When the back member 14 is located in an extreme position "C" that approaches the horizontal plane with respect to the base or seat bottom 11 should an individual attempt to return from a horizontal position to a vertical position, a force is often applied to the armrest 12. Such a force can place extreme stress on an armrest 12 that may damage the position retention components. The present invention, provides for a robust structure that is capable of withstanding such a force as applied to the armrest 12 even should such force approach 150 pounds before any stress would affect the retention components.

In more particular detail, the armrest 12 as best shown in FIGS. 2–9 is defined by a U-shaped housing 18 with parallel first 20 and second 22 side walls each of which have a first end 24 and a second end 26 with an opening 28 located adjacent the second end 26. The housing 18 is located on the back member 14 by pin 16 passing through the opening 28 in each of the first 24 and second 26 side walls such that the first end 24 of the housing 18 may pivot with respect to pin 16.

A first plate 30, see FIG. 4a, is fixed to the pin 16 and is located between the first 20 and second 22 side walls. The first plate 30 has an arcuate segment removed therefrom to define a first stop 32 and a second stop 34 such that when installed on pin 16 the first stop 32 defines a limit that end 24 may pivot toward back member 14 and the second stop 34 defines a limit that end 24 may pivot toward the base or bottom 11 of seat 10.

A second plate 36, see FIG. 4b, is fixed to pin 16 and is located between the first plate 30 and the second 22 side wall. The second plate 36 has a peripheral surface with an arcuate segment 38 having a first plurality of teeth 40 thereon that extend from a first location 42 to a second location 44. The first location 42 is matched and aligned with the first stop 32 and the second location 44 is matched and aligned with the second stop 34 on the first plate 30. The first plate 30 and the second plate 36 are fixed to pin 16 and correspondingly move in a same arc as the back member 14 is moved between a vertical position to a horizontal position as illustrated in FIGS. 1 and 2.

A first lever 48 has a first end 50 that is fixed to the first 20 side wall at a location adjacent the first end 24 of housing 18. The first lever 48 when fixed to the first 20 side wall defines a cantilevered beam with a second end 52 that is positioned in perpendicular alignment with pin 16. A guide pin 54 that extends between the first 20 and second 22 side walls is located in an opening 55 on the second end 52 of the first lever 48 to assist in preventing the second end 52 from rotating out of a plane with respect to the fixed end 50. The first lever 48 has a peripheral surface adjacent the second end 52 with a second plurality of teeth 56 thereon that mesh with the first plurality of teeth 40 on the second plate 36. The mean radius of the first plurality of teeth 40 on the second plate 36 and the mean radius of the second plurality of teeth 56 are different and while they mesh, a sufficient clearance is provided to allow the cantilever beam to laterally move without binding while providing substantially total engagement there between.

Figure 8:
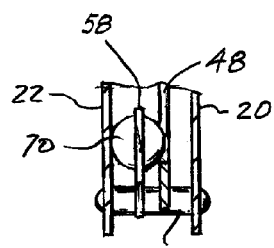
FIG. 8 is a view taken along lines 8—8 of FIG. 4.
Figure 9:
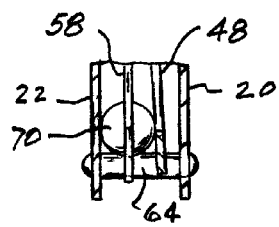
FIG. 9 is a view taken along lines 9—9 of FIG. 6.

A second lever 58 that is associated with the actuator 72 has a first end 60 and a second end 62. The second lever 58 is located in housing 18 by a pin 64 that is located between the first 20 and second 22 side wall and passes through the second lever 58 between the first end 60 and second end 62 to define a pivot point. A guide 66 that is attached to the second 22 side wall engages the first end 60 of the second lever 58 to assist in holding the second lever 58 in parallel alignment with the first lever 48. The second lever 58 has a circular slot 68 that is located adjacent the second 62 to receive and retain a ball 70. The location of pin 64 within housing 18 is such that ball 70 is positioned adjacent the second plate 36, in tangential engagement with the second 22 side wall and in contact engagement with the first lever 48, as shown in FIG. 8.

The actuator 72 that is attached to the first end 60 of lever 58 has sufficient length to extend past any covering for housing 18 to permit an individual to provide a force that unlocks a retention arrangement whereby the armrest 12 may thereafter be moved.

Figure 4:
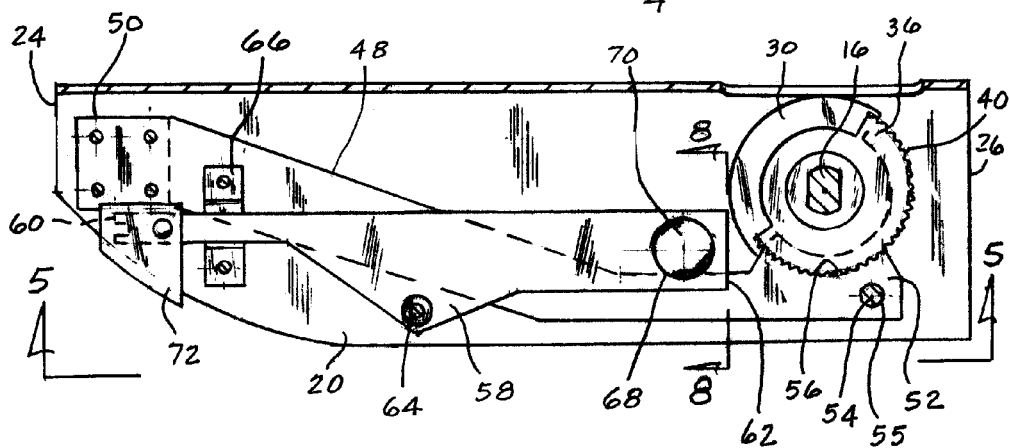
FIG. 4 is a sectional side view taken along lines 4—4 of FIG. 3 wherein the armrest is located in a fixed position on the back member and is in substantially parallel alignment with the base or bottom of the seat.
Figure 5:
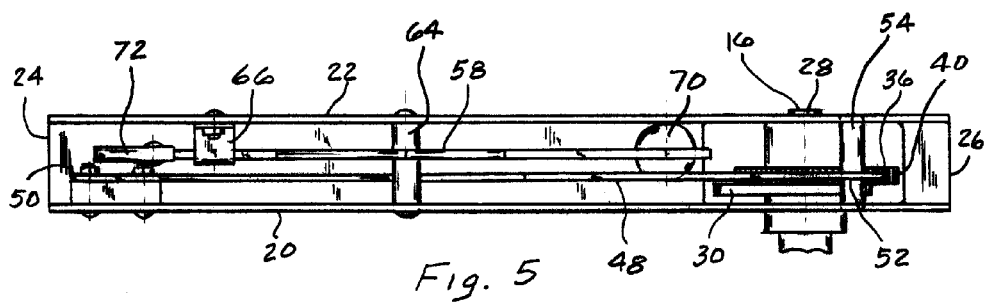
FIG. 5 is a view taken along lines 5—5 of FIG. 4.
Figure 6:
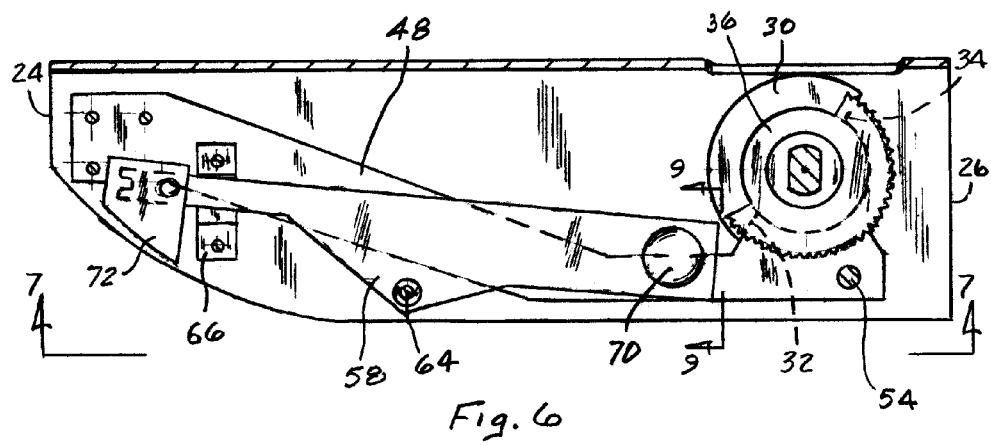
FIG. 6 is a sectional side view of the armrest of FIG. 1 wherein the component members have been moved to allow the armrest to be rotated with respect to the back member.
Figure 7:
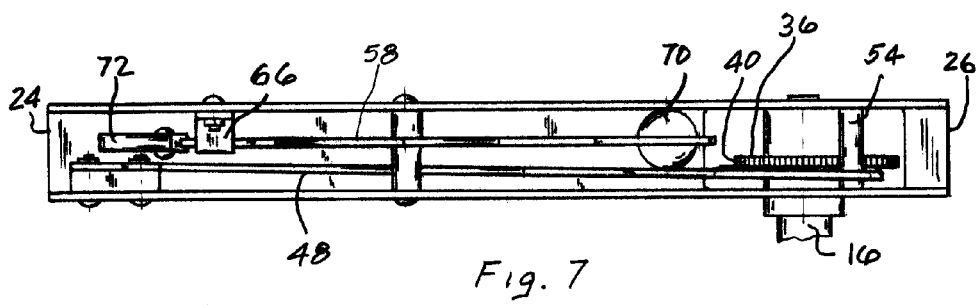
FIG. 7 is a view taken along lines 7—7 of FIG. 6.

In a rest position, the components of the armrest 12 are engaged as shown in FIG. 4 with the first 40 and second 56 teeth meshing to prevent the armrest 12 from rotating with respect to the back member 14. The armrest 12 is designed to provide support for an arm of an individual seated on the base or seat bottom 11 of seat 10. When an individual desires to adjust the position of back member 14 with respect to the base or seat bottom 11 of seat 10, an input force is applied by an individual through actuator 72 to the first end 60 of the second lever 58 that causes the second end 62 of the second lever 58 to pivot about pin 64 and move ball 70 along the second 22 side wall such that a force is applied to the first lever 48 through the contact engagement with ball 70, see FIG. 9. This force causes the first lever 48 to laterally move toward the first 20 side wall as a function of the capability of the flexure of the resulting cantilevered beam to bend such that the second plurality of teeth 56 move out of meshing engagement with the first plurality of teeth 40 and into an alignment on the first plate 30 between the first stop 32 and the second stop 34, as illustrated in FIG. 6. Thereafter, the first end 24 may pivot about pin 16 and be moved to a desired alignment with respect to the base or seat bottom 11 of seat 10. On termination of the input force applied by actuator 72 to end 60, the internal resiliently of the cantilevered beam defined by the first lever 48 returns the second end 52 of the first lever 48 to a perpendicular alignment with pin 16 such that the second plurality of teeth 56 adjacent end 52 again mesh with the first plurality of teeth 40 on plate 36 to sustain and retain the first end 24 of housing 18 in a desired fixed alignment with respect to the base or seat bottom 11 of seat 10. The second guide 54 engages the first lever 48 to prevent radial movement of the second end 52 with respect to the second plate 36 that would permit the second plurality of teeth 56 from being radially moved out of meshing engagement with the first plurality of teeth 40 and as a result substantially the entire arcuate length of the second plurality of teeth 40 remain engaged to hold the first end 24 in a desired fixed alignment that may be selected anywhere between the first stop 32 and the second stop 34 on the first plate 30 that an individual chooses that will provide support and comfort for resting an arm.

In an effort to simplify the armrest 12, an armrest 12a was developed that is identical to armrest 12 with the exception of the second lever 58 that was modified to define a lever 158 as illustrated in FIGS. 10, 11, 12 and 13. In armrest 12a, the ball circular slot 68 in lever 58 was eliminated and ball 70 was replaced by a semi-spherical projection 170 that was designed to extends toward the first side wall 20 and be located adjacent end 162 of lever 158. As in arm rest 12, the pivot pin 64 extends through lever 158 and locates the semi-spherical projection 170 adjacent the second plate 36 and in contact with the first lever 48 at point 172 as illustrated in FIGS. 11 and 12 that is below the apex 174 of the semi-spherical projection 170. The end 162 has a plurality of tabs 164, 164' that engage the second side wall 22 and with guide 66 hold the lever 158 in parallel alignment with side wall 22. The armrest 12a functions in a similar manner as armrest 12 in that an input force applied through actuator 72 causes lever 158 to pivot on pin 64 and move end 162 such that a force is applied through the semi-spherical projection 170 as the point contact moves from point 172 toward the apex 174 in a manner as illustrated in FIG. 13 to radially move end 52 of the first lever 48 toward the first side wall 20 as a function of the capability of the flexure of the cantilevered beam defined by the first lever 48 to bend such that the second plurality of teeth 56 are moved out of engagement with the first plurality of teeth 40 and thereafter aligned on the first plate 30 between the first stop 32 and the second stop 34, in a manner as illustrated in FIG. 6 such that the first end 24 of housing 18 may to pivot on pin 16 and be alignment with respect to the base or seat bottom 11 of seat 10.

Figure 16:
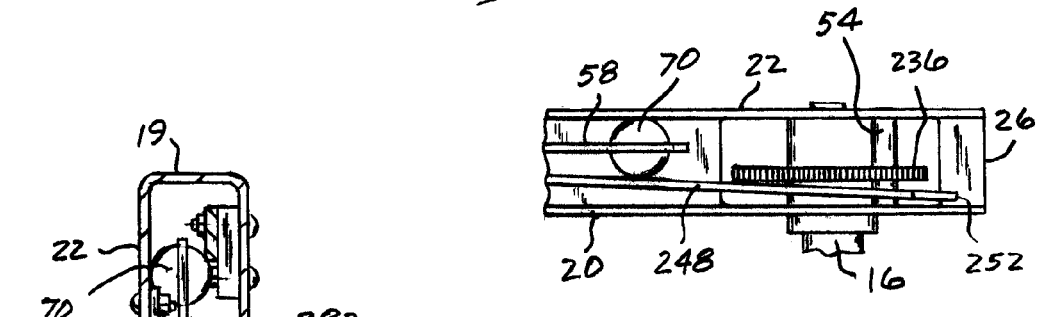
FIG. 16 is a view showing a relationship between the components of FIG. 14 to permit movement of the armrest with respect to the back member.

FIG. 14 illustrates an embodiment of armrest 12b that is derived from armrest 12 by modifying the first lever 48 to define lever 248 and modifying the second plate 36 to define plate 236 to eliminate plate 30. In more particular detail, lever 248 has a first end 50 and a second end 252 with the first end 50 being fixed to the first side wall 20 adjacent the first end 24 of housing 18 such that lever 248 defines a cantilevered beam. Lever 248 has an opening 258 adjacent the second end 252 with a plurality of inwardly extending radial teeth 270 that extend around the entire circumference of opening 258. Plate 236 is fixed on pin 16 and it has a plurality of outwardly extending radial teeth 240. The mean diameter of the outwardly extending radial teeth 240 and the mean diameter of the inwardly extending radial teeth 270 is such that they mesh but have a sufficient difference to allow for lateral movement of the cantilever beam defined by lever 248. In armrest 12b when end 50 is fixed to side wall 20, the end 252 of lever 248 is located in a perpendicular relationship with pin 16 such that the inwardly extending radial teeth 270 and outwardly extending radial teeth 240 are aligned in a same radial plane, as shown in FIG. 15. When it is desirous to move armrest 12b, an input force is applied through actuator 72 that causes the second lever 58 to pivot about pin 64 and move end 62 such that ball 370 tangentially engages side wall 22 and provides a force through the contact with lever 248 that moves the ball 370 such that end 252 laterally moves toward side wall 20 as a function of the flexibility of the resulting cantilevered beam and correspondingly the inwardly extending radial teeth 270 are moved out of meshing engagement with the outwardly extending radial teeth 240, as illustrated in FIG. 16. With inwardly extending radial teeth 270 located around pin 16, end 24 of housing 18 may be rotated 360 degrees to any position that would be comfortable for an occupant located on base or seat bottom 11 of seat 10. When a desired position is achieved, the input force applied through actuator 72 is removed and the internal resiliency of the first lever 248 defined by the resulting cantilevered beam returns the second end 252 to perpendicular alignment with pin 16 where the inwardly extending radial teeth 270 return to a total mesh with teeth 240 to hold the end 24 in a fixed position with respect to the base or seat bottom 11 of seat 10. In returning to the perpendicular alignment, guide 54 assists in assuring the meshing of the teeth occur as it may be necessary to apply a small adjusting input if the teeth are located in a position that is in-between the individual apex of the plurality of teeth.

Figure 17:
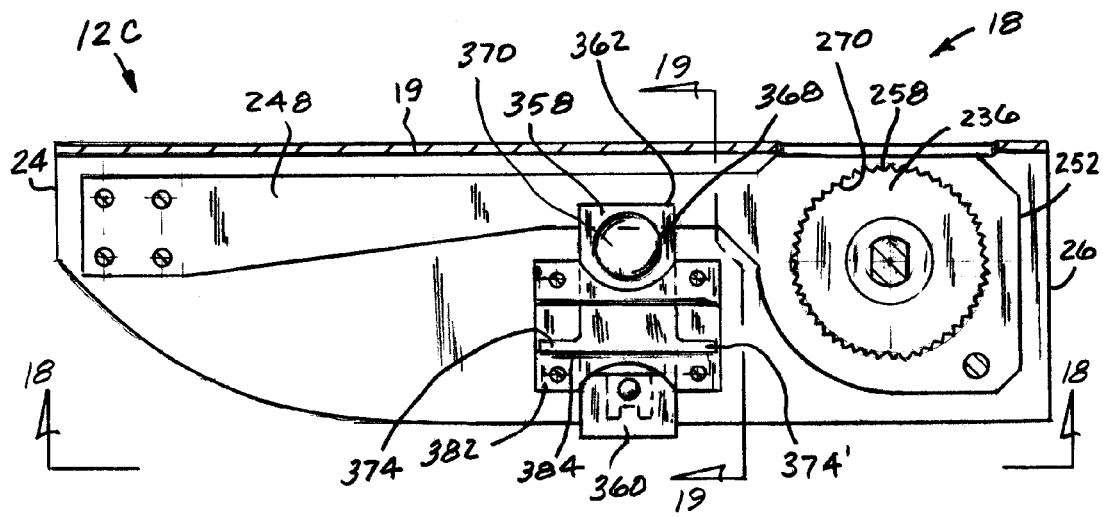
FIG. 17 is a schematic view of a secondary embodiment of an actuator for the armrest of FIG. 4.
Figure 18:
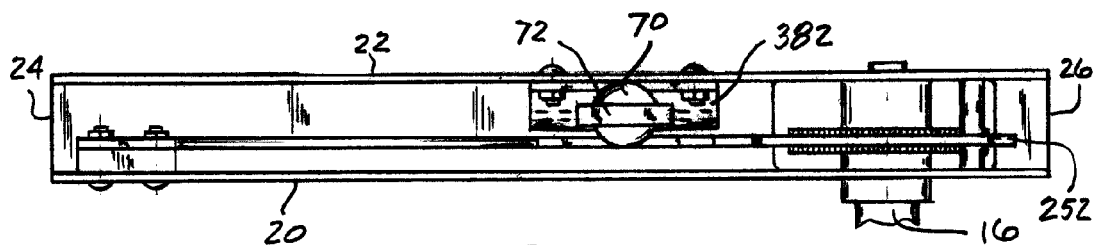
FIG. 18 is a view taken along lines 18—18 of FIG. 17.
Figure 19:
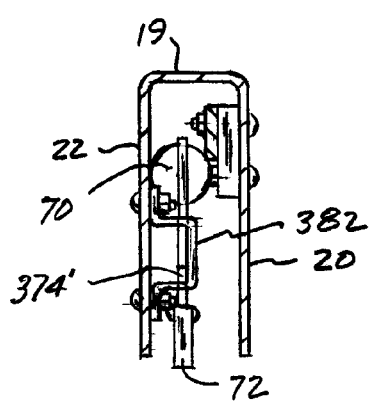
FIG. 19 is a view taken along lines 19—19 of FIG. 17.

The armrest 12b was modified to define armrest 12c by combining lever 58 and actuator 72 into a unitary actuator assembly as illustrated in FIG. 17. This actuator assembly includes lever 358 that has a first end 360 that extends past guide 382 and a second end 362 that extends past a second edge of guide 382 toward the top 19 of the U-shaped housing 18. Lever 358 has a cylindrical opening or slot 368 that receives a bell 370 and tabs 374,374 that engage the base 384 of guide 382. When guide 382 is attached to side wall 22, ball 370 tangentially engages side wall 22 and a portion thereof contacts lever 248 as illustrated in FIGS. 18 and 19. When an occupant desires to adjust armrest 12c, an input force is applied to the first end 360 of lever 258 that causes lever 358 to slide within guide 382 and ball 370 to roll on side wall 22 while at the same time laterally moving the first lever 248 toward the first wall 20 as the contact engagement of ball 370 with lever 248 increases toward the apex of the ball 370, to move the inwardly extending radial teeth 270 out of meshing engagement with the outwardly extending radial teeth 240 in a manner as illustrated in FIG. 16. With inwardly extending radial teeth 270 located around pin 16, end 24 of housing 18 may be rotated 360 degrees to any position that would be comfortable for an occupant of base or seat bottom 11 of seat 10. When a desired position is achieved, the input force applied to end 360 is removed and the internal resiliency of the first lever 248 defined by the cantilevered beam returns the second end 252 to perpendicular alignment with pin 16 where the inwardly extending radial teeth 270 mesh with teeth 240 to hold the end 24 in a fixed position with respect to the base or seat bottom 11 of seat 10.

What is claimed is:

1. An armrest and back member for a seat having a seat bottom wherein the back member is selective rotatable between a substantially vertical position to a substantially horizontal position with respect to the seat bottom, said back member having a first pivot pin attached thereto that moves in an arc as said back member is rotated between said vertical and horizontal positions, said armrest comprising:

a housing defined by parallel first and second side walls that each have a first end and a second end with a first opening located adjacent to said second end, said housing being located on said back member by said first pivot pin extending through said first opening in each of said first and second side walls such that said first end of said housing may pivot with respect to said first pivot pin;

a first plate fixed to said first pivot pin and located between said first and second side walls, said first plate having a first surface that defines a first stop and a second surface that defines a second stop;

a second plate fixed to said first pivot pin and located between said first plate and said second side wall, said second plate having an arcuate surface thereon with a first plurality of teeth thereon that extend from a first location to a second location, said first location being aligned with said first stop and said second location being aligned with said second stop;

a first lever having a first end and a second end, said first end being fixed to said first end of said first side wall to define a cantilevered beam and position a second plurality of teeth on a said second end thereof in engagement with said first plurality of teeth on said second plate;

a second lever having a first end and a second end, said second lever having an oval slot located adjacent said second end thereof;

a ball that is located in said oval slot;

a second pivot pin that is secured to said first and second side walls and extends through said second lever to locate said ball adjacent said second plate with said ball in tangential engagement with said second side wall and in contact engagement with said first lever; and an actuator for applying an input force to said first end of said second lever that causes said second end of said second lever to pivot about said second pivot pin and move said ball on the second side wall such that a force is applied to said first lever through said contact engagement with said ball that causes said first lever to laterally move toward said first side wall as a function of a flexure of said cantilevered beam to bend such that said second plurality of teeth are moved out of engagement with said first plurality of teeth and aligned on said first plate between said first stop and said second stop to thereafter permit said first end of said housing to be moved by pivoting about said first pivot pin to a desired alignment with respect to said seat bottom, said first lever on termination of said input force resiliently returning to alignment with said second plate such that said second plurality of teeth again mesh with said first plurality of teeth to retain said first end of said housing in said desired alignment with said seat bottom.

2. The armrest and back member as recited in claim 1 further including:

a first guide is connected to said second end of said first lever to prevent movement of said second end of said first lever with respect to said second plate that would permit said second plurality of teeth from radially moving with respect to said first plurality of teeth.

3. The armrest and back member as recited in claim 1 wherein an arcuate distance between said first location and said second location of said first plurality of teeth on said second plate encompasses an entire circle.

4. The armrest and back member as recited in claim 1 wherein an arcuate distance between said first location and said second location of said second plate is such that said first end of said housing may be aligned in a horizontal plane with respect to said seat bottom when said back member is rotated between said vertical position and said horizontal position.

5. The armrest and back member as recited in claim 1 further including:

a second guide that is connected to said second side wall and engages said first end of said second lever to assist in retaining said second lever in a parallel alignment with said second side wall such that said ball always remains in tangential contact with said second side wall.

6. The armrest and back member as recited in claim 1 wherein at every desired alignment said second plurality of teeth essentially engage all of said first plurality of teeth.

7. The armrest and back member as recited in claim 1 wherein said first side wall is separated from said second side wall by a uniform member that extends from said first end to said second end such that said housing has a U-shape.

8. An armrest and back member for a seat having a base wherein the back member is selective rotatable between a substantially vertical position to a substantially horizontal position with respect to the base, said back member having a first pivot pin attached thereto that moves in an arc when said back member is rotated between said vertical position and said horizontal position, said armrest comprising:

a housing defined by parallel first and second side walls that each have a first end and a second end with a first opening located adjacent said second end, said housing being located on said back member by said first pivot pin extending through the first opening in each of said first and second side walls such that said first end of said housing may pivot about said first pivot pin;

a plate fixed to said first pivot pin and located between said first side wall and said second side wall, said plate having an arcuate peripheral surface with a first plurality of radial teeth thereon;

a first lever having a first end and a second end, said first end of said first lever being fixed to said first end of said first side wall to define a cantilevered beam, said first lever having an opening with a second plurality of inwardly extending radial teeth adjacent said second end, said second plurality of teeth meshing with said first plurality of teeth on said plate;

a second lever having a first end and a second end, said second lever having an oval slot therein that is located adjacent said second end;

a ball located in said oval slot;

a second pivot pin secured to said first and second side walls and extending through said second lever to position said ball adjacent said plate with said ball being located in tangential engagement with said second side wall and in contact engagement with said first lever; and an actuator for applying an input force to said first end of said second lever that causes said second end of said second lever to pivot about said second pivot pin and move said ball on said second side wall such that a force is applied to said first lever through said contact engagement with said ball that causes said first lever to laterally move toward said first side wall as a function of a resiliency of said cantilevered beam such that said second plurality of teeth are moved out of mesh engagement with said first plurality of teeth to thereafter permit said first end of said housing to pivot about said first pivot pin until a desired alignment is achieved with respect to said base, said first lever on termination of said input force resiliently returning said second plurality of teeth into meshing engagement with said first plurality of teeth to retain said first end of said housing in said desired alignment with said seat.

9. The armrest and back member as recited in claim 8 further comprising:
a guide that is connected to said second side wall and engages said second lever at a position adjacent said first end thereof to assist in retaining said second lever in a parallel alignment with said second side wall such that said ball is in tangential contact with said second side wall.

10. The armrest and back member as recited in claim 9 wherein at every desired alignment said second plurality of teeth essentially mesh with all of said first plurality of teeth.

11. The armrest as recited in claim 10 wherein said opening in said second end of the second lever has a first mean radius that is larger than a second mean radius for the peripheral surface of said plate such that said first and second plurality of teeth mesh to hold said housing in a fixed position with respect to said first pivot pin and yet allows said second end of said first lever to laterally move as a result of said ball acting on said first lever to permit said second plurality of teeth to be disengaged from said first plurality of teeth and thereafter allow said first end of said housing to pivot about said first pivot pin.

12. An armrest and back member for a seat having a base wherein the back member is selective rotated between a substantially vertical position to a substantially horizontal position with respect to the base, said back member having a first pivot pin attached thereto that moves in an arcuate plane when said back member is rotated between said vertical position and said horizontal position, said armrest comprising:
a housing defined by parallel first and second side walls wherein each have a first end and a second end with a first opening located adjacent said second end, said housing being located on said back member by said first pivot pin extending through the first opening in each of said first and second side walls such that said first end of said housing may pivot about said first pivot pin;
a plate fixed to said first pivot pin and located between said first side wall and said second side wall, said plate having an arcuate peripheral surface with a first plurality of radial teeth thereon;
a first lever having a first end and a second end, said first end of said first lever being fixed to said first end of said first side wall to define a cantilevered beam, said first lever having an opening adjacent said second end with a second plurality of inwardly extending radial teeth thereon, said second plurality of teeth meshing with said first plurality of teeth;
a second lever having a first end and a second end, said second lever having a tapered radial projection that is located adjacent said second end thereof, said tapered radial projection having an apex that is located near a top of said second lever;
a second pivot pin secured to said first and second side walls and extending through said second lever to locate said radial projection on said second lever adjacent said plate such that said apex engages said first lever;
an actuator for applying an input force to said first end of said second lever that causes said second end of said second lever to pivot about said second pivot pin and move said tapered radial projection such that a force is applied to said first lever that causes said first lever to laterally move toward said first side wall as a function of a resiliency of said cantilevered beam and correspondingly move said second plurality of teeth out of mesh engagement with said first plurality of teeth to thereafter permit said first end of said housing to pivot about said first pivot pin and be moved into a desired alignment with respect to said base, said first lever on termination of said input force resiliently returning said second plurality of teeth into meshing engagement with said first plurality of teeth to retain said first end of said housing in said desired alignment.

13. An armrest and back member for a seat having a base wherein the back member is selective rotatable between a substantially vertical position to a substantially horizontal position with respect to said base, said back member having a pivot pin attached thereto that moves in an arc when said back member is rotated between said vertical position and said horizontal position, said armrest comprising:
a housing defined by parallel first and second side walls that each have a first end and a second end with a first opening adjacent said second end, said housing being located on said back member by said pivot pin extending through the first opening in each of said first and second side walls such that said first end of said housing may pivot about said first pivot pin;
a plate fixed to said pivot pin and located between said first side wall and said second side wall, said plate having an arcuate peripheral surface with a first plurality of radial teeth thereon;
a lever having a first end and a second end, said first end of said lever being fixed to said first end of said first side wall to define a cantilevered beam, said lever having an opening with a second plurality of inwardly extending radial teeth located adjacent said second end, said second plurality of teeth meshing with said first plurality of teeth;
an actuator having a first end and a second end, said actuator having a circular slot therein that is located adjacent said second end;
a ball located in said circular slot; and
a guide surrounding said actuator to locate said ball adjacent said plate wherein said ball is in tangential engagement with said second side wall and in contact engagement with said lever, said first end of said actuator receiving an input force that is transferred to said second end thereof to move said ball on said second side wall such that a force is applied to said lever through said contact engagement causing said lever to laterally move toward said first side wall as a function of a resiliency of said cantilevered beam such that said second plurality of teeth are moved out of mesh engagement with said first plurality of teeth to thereafter permit said first end of said housing to pivot about said pivot pin and be moved to a desired alignment with respect to said base, said lever on termination of said input force resiliently returning said second plurality of teeth into meshing engagement with said first plurality of teeth to retain said first end of said housing in said desired alignment.

14. The armrest and back member as recited in claim 13 further including a spring that acts on said actuator to maintain said ball in tangential engagement with said second side wall and in contact engagement with said lever.

* * * * *